(12) United States Patent
Boillot

(10) Patent No.: US 7,725,288 B2
(45) Date of Patent: May 25, 2010

(54) METHOD AND SYSTEM FOR OBJECT CONTROL

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 691 days.

(21) Appl. No.: 11/562,404

(22) Filed: Nov. 21, 2006

(65) Prior Publication Data

US 2007/0288194 A1    Dec. 13, 2007

Related U.S. Application Data

(60) Provisional application No. 60/740,151, filed on Nov. 28, 2005.

(51) Int. Cl.
G01B 17/00    (2006.01)
(52) U.S. Cl. .................................. 702/159; 702/158
(58) Field of Classification Search ............. 702/39–40, 702/72, 159
See application file for complete search history.

(56) References Cited

U.S. PATENT DOCUMENTS

| | | | |
|---|---|---|---|
| 5,059,959 A * | 10/1991 | Barry | 345/168 |
| 5,274,363 A | 12/1993 | Koved | |
| 5,510,800 A * | 4/1996 | McEwan | 342/387 |
| 6,130,663 A | 10/2000 | Null | |
| 6,137,427 A | 10/2000 | Binstead | |
| 6,313,825 B1 | 11/2001 | Gilbert | |
| 6,937,227 B2 | 8/2005 | Qamhiyah | |
| 7,050,177 B2 | 5/2006 | Tomasi et al. | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 7,157,685 B2 | 1/2007 | Bamji et al. | |
| 7,317,954 B2 | 1/2008 | McGreevy | |
| 2002/0033803 A1 * | 3/2002 | Holzrichter et al. | 345/158 |
| 2005/0210419 A1 | 9/2005 | Kela et al. | |
| 2006/0161870 A1 | 7/2006 | Hotelling et al. | |
| 2006/0161871 A1 | 7/2006 | Hotelling | |
| 2006/0256090 A1 | 11/2006 | Huppi | |
| 2006/0267951 A1 | 11/2006 | Rainisto | |
| 2007/0296696 A1 | 12/2007 | Nurmi | |
| 2008/0005703 A1 | 1/2008 | Radivojevic et al. | |
| 2008/0229255 A1 | 9/2008 | Linjama et al. | |

* cited by examiner

*Primary Examiner*—Hal D Wachsman
*Assistant Examiner*—Mi'schita' Henson

(57) ABSTRACT

A system (100) and method (400) for touchless object control is provided. The system can include a sensing unit (110) for capturing a first signal (677) reflected off a first object (151) at a first time and a second signal (679) reflected off the first object at a second time, a phase detector (116) for identifying a first phase difference (601) between the first signal and the second signal, and a processor (117) for updating an expected location of the first object using the first phase difference. A first object (143) can control a movement of a second object (124) using touchless control.

18 Claims, 10 Drawing Sheets

METHOD AND SYSTEM FOR OBJECT CONTROL

CROSS-REFERENCE TO RELATED APPLICATION

This application claims the priority benefit of U.S. Provisional Patent Application Ser. No. 60/740,151 entitled "Method and System for Object Control" filed Nov. 28, 2005, the entire contents of which are hereby incorporated by reference. This application also incorporates by reference the following Utility Applications: U.S. patent application Ser. No. 11/559,295, entitled "Method and System for Directing a Control Action", filed on Nov. 13, 2006, and U.S. patent application Ser. No. 11/559,325, entitled "Method and System for Touchless User Interface Control", filed on Nov. 13, 2006.

BACKGROUND

1. Field

The present embodiments of the invention generally relates to the field of touchless motion sensing, and more particularly to input pointing devices.

2. Introduction

Motion detection systems can include radar systems, video camera monitoring systems, outdoor lighting systems, and medical diagnostic systems. Motion detection systems generally include a sensor which converts a physical signal into an electronic signal. The sensor performs the task of capturing the signal and converting it to a suitable format for processing. A motion detection system can include a input device for interpreting the sensory information and identifying whether an object has moved.

SUMMARY

Broadly stated, embodiments of the invention concern an touchless input device. The touchless input device can include at least one sensor for capturing a first signal and a second signal associated with a control object, and a phase detector for estimating a phase difference for updating a relative displacement and an estimated location of an controlled object.

One embodiment is directed to an input device for touchless object control. The touchless input device can include a sensing unit for capturing a first signal reflected off a control object and a second signal reflected off the control object, a phase detector operatively coupled to the sensing unit for identifying a first phase difference between the first signal and the second signal, and a processor operatively coupled to the phase detector and the sensing unit for updating an expected location of a controlled object using the first phase difference associated with the control object. The processor can determine an estimated location of the control object, and determine if the estimated location is within a region of relative displacement error of the expected location in view of the first phase difference. The estimated location can be determined from a time of flight measurement (TOF). The relative displacement can be determined from a differential time of flight measurement (dTOF). The processor can determine a relative displacement of the control object in view of the first phase difference, the estimated location, and the expected location. In one aspect, the processor can apply a weighted average to a history of estimated locations for determining the expected location. The sensing unit can be an ultrasonic sensor, an optical sensor, an imaging element, a camera element, or a laser element.

Another embodiment is also directed to a touchless input device for touchless object control. The input device can include a sensing unit for transmitting a first transmitted signal and receiving a first received signal that is reflected off a control object, a phase detector operatively coupled to the sensing unit for identifying a first phase difference between the first transmitted signal and the first received signal, and a processor operatively coupled to the phase detector and the sensing unit for updating an expected location of the control object using the first phase difference. The processor can identify an estimated location of the control object, and determine if the estimated location is within a region of relative displacement error of the expected location. The processor can determine a relative displacement of the control object in view of the first phase difference, the estimated location, and the expected location. In one arrangement, the control object can be a finger, and the controlled object can be a cursor. The input device can track a touchless finger movement and control the cursor in accordance with the finger movement.

Another embodiment is directed to a method for object control. The method can include monitoring a movement of a control object, estimating a location of the object to produce an estimated location, calculating a relative displacement of the control object, and updating an expected location of the control object in view of the estimated location and the relative displacement. The method can further include determining if the estimated location is within a region of relative displacement error of the expected location. If so, the expected location can be updated with the estimated location and the relative displacement. If not, the expected location can be updated with the relative displacement.

In one arrangement, the method can include capturing a first signal reflected off the control object and a second signal reflected off the control object, and identifying a first phase difference between the first signal and the second signal. In another arrangement, the method can include capturing a first transmitted signal and a first received signal reflected off the control object; and identifying a first phase difference between the first transmitted signal and the first received signal. A weighted average of the expected location and estimated location can be applied to a phase difference for updating the relative displacement. In one arrangement, the control object can also be the controlled object.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
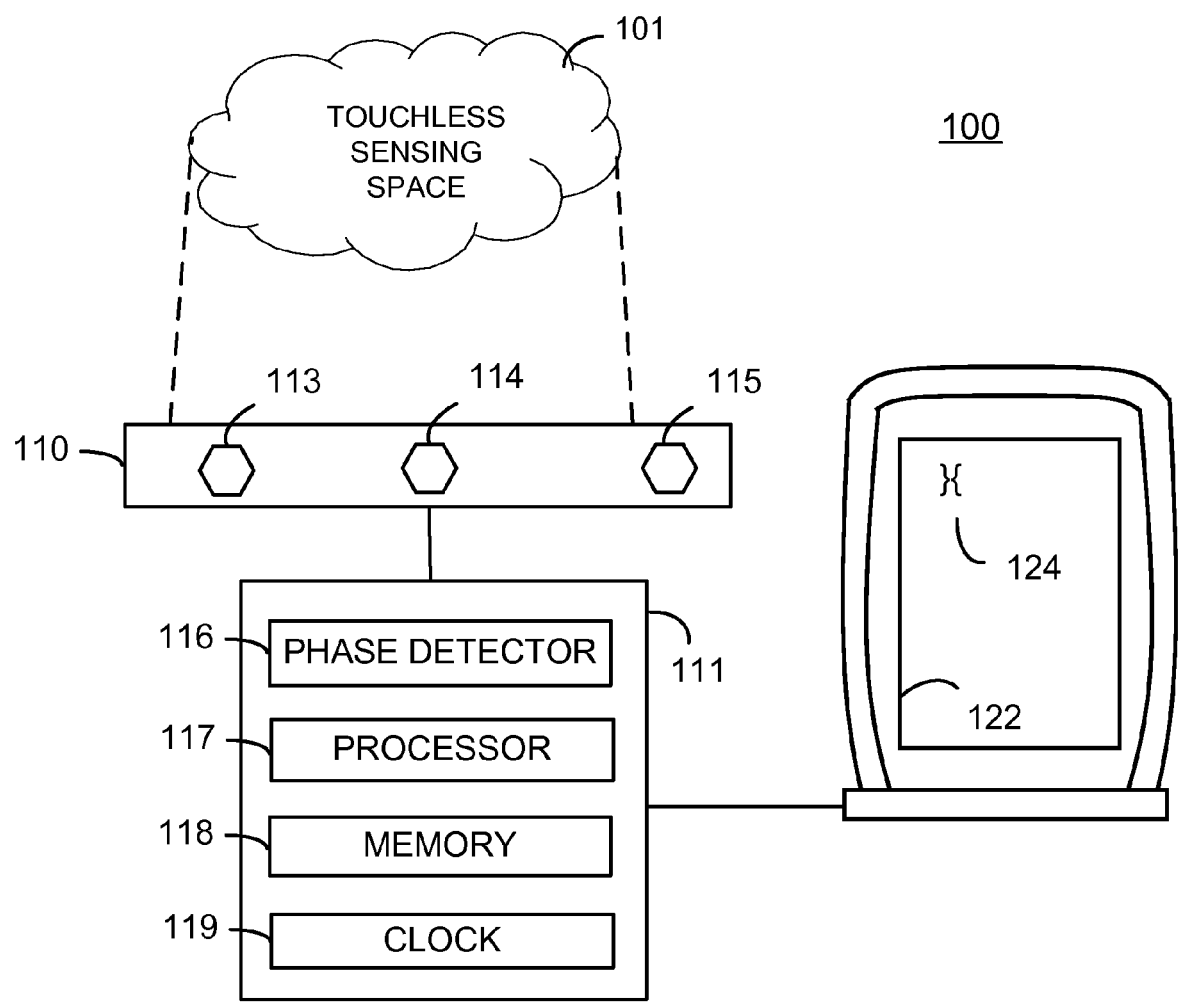
FIG. 1 is a touchless interface system for touchless control in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The term, housing, is defined as the mechanical or plastic material that envelopes at least one object and forming a continuous medium with other said objects.

FIG. 1

Referring to FIG. 1, a touchless interface system 100 is shown. The touchless interface system 100 can include a sensing unit 110 for creating a touchless sensing space 101, and an input device 111 for controlling an object in accordance with touchless movement in the touches sensing space 101. As one example, a user can control a cursor object 124 in a display 122 using touchless finger controls in the touchless sensing space 101. The finger can be the control object, and the cursor can be the controlled object. In such regard, the sensing unit 110 can detect a location of the finger, and the processor 117 can convert the finger location and movement into a coordinate that can be input to a computer for positioning the cursor 124.

The touchless interface system 100 can include a display for visualizing a control of the object. In one arrangement, the sensing unit 110 can include a transmitter 114, a first receiver 113 and a second receiver 115 as sensors. The sensors can be ultrasonic transducers, acoustic microphones, Micro Electro Mechanical Element (MEMS) microphones, CMOS imagers, optical sensors, or any other sensors for converting a physical media to an electric signal such as a voltage or current, but is not limited to these. The input device 111 can include, but is not limited to, a phase detector 116, a processor 117, a memory 118, and a clock 119. The sensors can generate a radiation pattern which is maximally wide in a generally vertical plane to create an approximately planar touchless sensing field 101. The input device 111 can be integrated within the sensing unit 110, or apart from, the sensing unit 110. The phase detector 116 can be cooperatively connected to the sensing unit 110 for processing transmitted and received signals. The phase detector 116 can be coupled to the processor 117 for calculating phase differences across multiple return signals. The processor 117 can process these phase differences for estimating a movement of a finger in the touchless sensing space 101.

The operative aspects of the embodiments of the invention are described herein primarily in the context of updating a position or displacement of a cursor object. It should also be noted that an object of the cursor can be controlled in accordance with touchless movements. It will be apparent to one of ordinary skill, however, that the embodiments of the invention applies equally well in other contexts such as imaging systems, measurement systems, radar systems, diagnostic systems and the like concerned with moving a second object in accordance with a change of position of a first object.

FIG. 2

Figure 2:
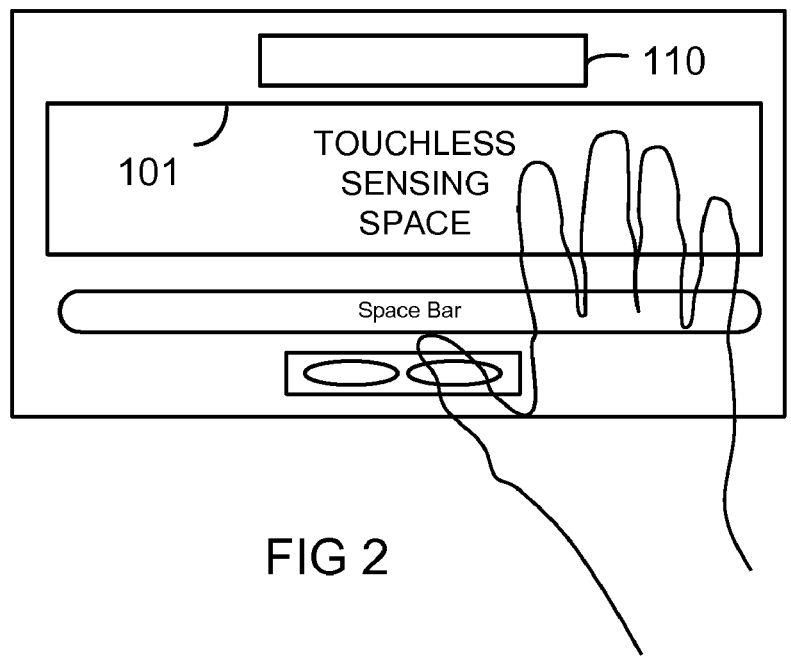
FIG. 2 is a touchless keyboard arrangement accordance with an embodiment of the inventive arrangements.

Referring to FIG. 2, one exemplary use of the touchless interface system 100 is shown. The touchless interface system 100 can be used with a keyboard 200 for text processing or any other user input or control application. Briefly, the sensing unit 110 can detect a finger movement above the keyboard 200, and the processor 117 can control the cursor 124 on a display in accordance with the touchless finger movement. As an example, the sensing unit 110 can estimate a touchless finger position or movement above the keyboard and position the cursor 124 on a display 122. That is, the user can interface with the keyboard or a computer without physical touching. A user can control the cursor 124 or an object of the cursor through touchless finger control in the touchless sensing space 101.

FIG. 3

Figure 3:
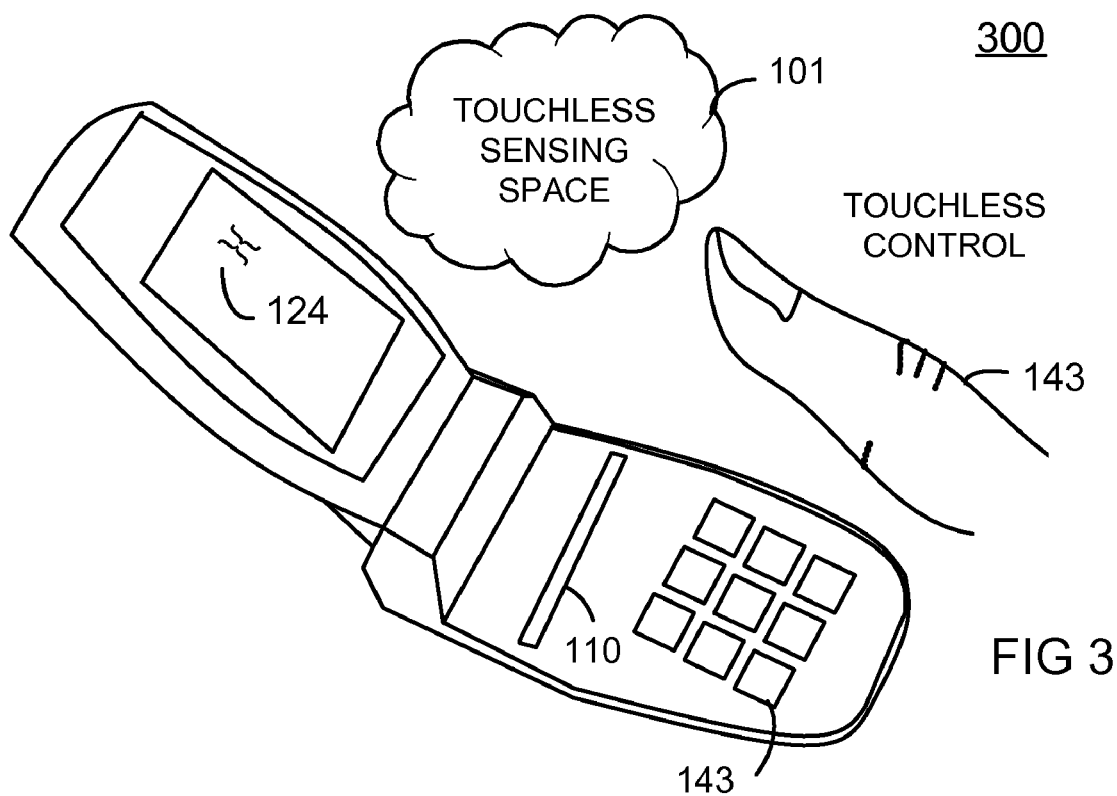
FIG. 3 is a touchless mobile device arrangement in accordance with an embodiment of the inventive arrangements.

Referring to FIG. 3, another exemplary application for the touchless interface system 100 of FIG. 1 is shown. In particular, the sensing unit 110 and the input device 111 can be integrated with a mobile device 300. In one arrangement, the sensing unit 110 can be placed above a keypad 143 of the mobile device 400. The sensing unit 110 can create the touchless sensing space 101 over the keypad 143 and in front of a display. The touchless sensing space is not limited to the arrangement shown. For example, the touchless sensing space 101 can be above the keypad, above the display, or above another portion of the mobile device 400. The touchless sensing space 101 provides a virtual interface to the mobile device. A user can position a finger 143 or a thumb within the touchless sensing space 101 to handle one of more controls of the mobile device through touchless finger movements. A control can be a menu object or a cursor 124, but is not herein limited to these.

FIG. 4

Figure 4:
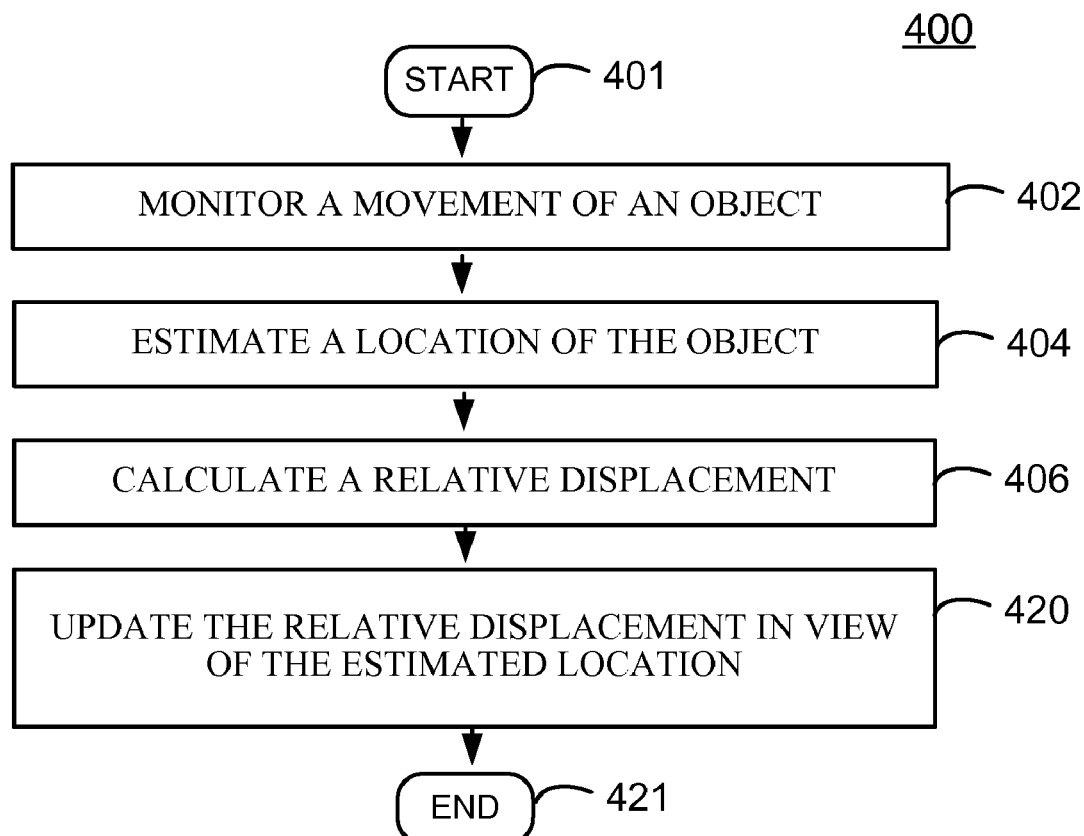
FIG. 4 is a method for touchless object control in accordance with an embodiment of the inventive arrangements.

Referring to FIG. 4. a method 400 for touchless object control is shown. When describing the method 400, reference will be made to FIGS. 1, 2, and 3 although the method 400 can be practiced in any other suitable system or device. Moreover, the steps of the method 400 are not limited to the particular order in which they are presented in FIG. 4. The inventive method can also have a greater number of steps or a fewer number of steps than those shown in FIG. 4. Accordingly, the invention is not limited to these particular steps.

At step 401, the method can start. At step 402, an object movement can be monitored. For example referring to FIG. 2, the sensing unit 110 can sense an control object, such as a finger, moving above the keyboard 200. The sensing unit 110 can track finger movement and convert the physical movement into time of flight (TOF) measurements. For example, referring to FIG. 1, the transmitter 114 emits a signal which can reflect off the finger and produce a return signal captured by the receiver 115 or receiver 113. The signal can be an ultrasonic signal, a light signal, an optical signal, or any other signal. The sensing unit 110 is not limited to the number of sensors shown or the types of sensors. The sensing unit 110 can also be a camera system which uses image pixels to capture a time of flight reference. The sensing unit 110 can determine a time of flight measurement by estimating the amount of time expiring between when the signal was transmitted and when it was received. The sensing unit 110 can include additional processing logic such as threshold detectors, and tracking circuits, for estimating the arrival time, or time of flight (TOF). The sensing unit 110 can convert the TOF to a two-dimensional coordinate value for each finger movement monitored. The sensing unit 110 and clock 119 can together establish the transmission times for monitoring finger movement to achieve smooth motion.

At step 404, a location of the control object can be estimated to provide an estimated location. Referring to FIG. 2, the processor 117, can estimate the location of the finger from the time of flight measurements. The processor 117 can estimate the time difference between when a signal was transmitted and when it was received to calculate the TOF. For example, two receivers, 113 and 115, that are positioned equidistant from one another produce a TOF measurement at each receiver that specifies a unique position of the finger. A single TOF measurement calculated by each of the two receivers 113 and 115 can uniquely specify one location in a two-dimensional coordinate system, which is considered an absolute location, it can also be considered an estimate, since the TOF may be inaccurate due to signal distortion or reception. The sensing unit 110 uses the TOF to estimate a position of the finger based on calculating an intersection point of ellipses. The sensing unit 110 can calculates the absolute location of the finger in a two or three dimensional coordinate space. The processor 117 can also save estimated locations to memory 118.

At step 406, a relative displacement of the finger can be calculated. A relative displacement is a distance the object travels in a coordinate space of the object. For example, referring to FIG. 3, the phase detector 116 calculates the phase difference between signals arriving at a receiver. For example, the phase detector 116 can calculate a first phase difference for two signals captured at receiver 113. Similarly, the phase detector 116 can calculate a second phase difference for two signals captures at receiver 115. and 116. Phase differences can be calculated for signals sufficiently coincident in time or separated in time. For example, the transmitter 114 transmits a signal and the receiver 115 captures a first return signal. At a later moment in time, the clock 119 informs the transmitter 114 to transmit a second signal and the receiver 115 captures a second return signal 115. The phase detector 116 can determine a phase between the first signal and the second signal. The relative displacement can be calculated by adding the phase difference in samples to an expected location of the object.

In another arrangement, the receiver 113 and receiver 115 can both capture the same return signal though the signals received by the receivers will have slightly different phase. The phase detector 116 estimates the phase using time differential analysis. The phase detector measures the time difference between a first and second return signal using a reference marker on each signal. In one arrangement, the reference marker is a zero crossing though it can be any characteristic reference on the signal such as a threshold crossing or correlation point. The time difference between the reference markers reveals the phase delay which the phase detector 116 uses to determine the relative finger displacement. The phase detector 116 converts phase differences in the time domain to physical displacements in a two or three dimensional finger coordinate space above the keyboard.

The processor can represent the movement of the finger in the touchless sensing space 101 as differential motion based on the transmit and receive sampling intervals. The processor 117 can then translate the differential finger movement into a cursor movement. The phase detector 116 can synchronize with the clock 119 for determining precise timing information. The processor 117 can store a history of relative cursor coordinates, relative finger movements, or estimated finger locations, in the memory 118 which can be used for identifying a finger position. The memory 118 can store historic data captured by the sensing unit 110 or data processed by the phase detector 116 and processor 117. The processor 117 can also estimate an absolute position that is coupled with the phase difference for determining a relative displacement. The phase detector 116 can be used without the processor 117 for calculating relative motion without reference to an absolute location.

At step 420, the relative displacement can be updated in view of the estimated location. In particular, the relative displacement is adjusted if the estimated location is not within an expected location. For example, the relative displacement can be phase difference in samples, if the estimated location is close to an expected location. The relative displacement can also be a weighted phase difference if the estimated location is not close to an expected location. In another arrangement, an expected location of the object can be updated based on the estimated location and the relative displacement. In this case, the relative displacement is used in conjunction with the estimated location to refine the expected location. At step 421, the method can end.

FIG. 5

Figure 5:
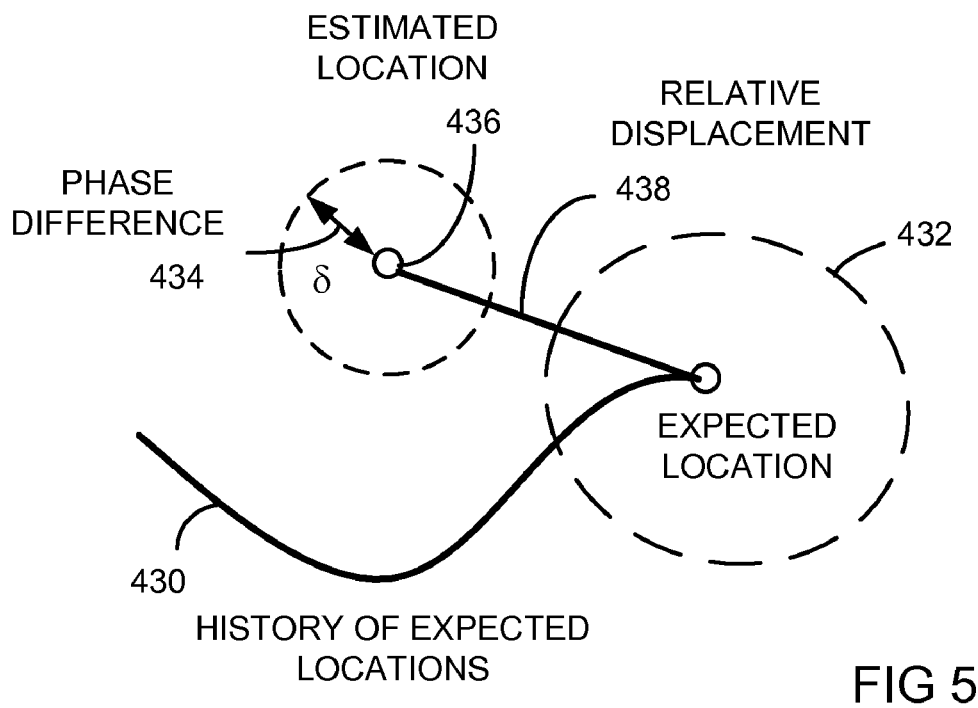
FIG. 5 is an illustration for tracking a control object in accordance with an embodiment of the inventive arrangements.

Referring to FIG. 5, an illustration for tracking a location of an object with respect to an expected location, an estimated location, and a relative displacement is shown. As one example, the control object can be a finger that is tracked to control a cursor object on a screen, as shown in FIG. 2. In order to track the movement, a history of the finger locations can be stored in the trajectory 430. The trajectory 430 can be a history of expected locations captured over time. An expected location is a weighted average of historic estimated locations that are smoothed over time. An estimated location 436 is a location determined from a direct analysis of the transmit and receive signals. The trajectory 430 is generally smooth to reflect the continuous movement of the finger. While the finger is moving, it can be expected that the finger motion will not dramatically depart from the trajectory 430. That is, an object generally moves along a continuum of points. An expected location 432 of the finger can fall within a variance determined from historic locations of the trajectory 430. Accordingly, a next location 432 of the finger can be anticipated to fall within the expected location 432. The next location is also considered the estimated location 436 of the finger. The estimated location 436 is a measured position of a current finger location from an analysis of reflection signals. The estimated 436 location may be accurate or inaccurate.

Accordingly, the processor 117 keeps a history of estimated locations 436 and evaluates the history to determine if the estimated location 436 is close to the expected location 432. The relative displacement 438 can be updated based on how close the estimated location 436 is to the expected location 432. In such regard, the finger can be tracked based on relative displacements 438 alone. However, if the relative displacements 438 are imprecise, then over time, the expected location 432 may not match an actual location of the object. That is, the expected location 432 may not coincide with the actual, or absolute, location if the expected location is always updated only on relative displacements 438. Accordingly, the relative displacements 438 are updated to take into account an absolute position of the object by weighting the estimated location 436. However, only an estimate of the absolute position is provided; that is, the estimated location 436. With respect to the cursor control example of FIG. 2, the relative displacements can be sent to a computer for moving a cursor on the screen.

In particular, a phase difference 434 is calculated for the estimated location 436. The phase difference reveals a distance the control object, such as the finger, has moved. Accordingly, if the phase difference 434 combined with the estimated location places the finger location outside of the expected location 432, then it can be determined that the estimated location 436 is incorrect. The relative displacement can then be updated based on the expected location 432 alone. If the phase difference combined with the estimated location places the finger location inside the expected location 432, then it can be determined that the estimated location 436 is correct. The relative displacement can then be updated based on the estimated location 436 and the expected location 432. Notably, a weighting can be applied to soft limit the relative displacement updated instead of applying the hard limit. In such regard, the relative displacement can be updated based on a weighting of the estimated location and the expected location.

Referring back to FIG. 3, the processor 117 first calculates a relative displacement from phase differences provided by the phase detector 116, and secondly updates this relative displacement based on the estimated location of the finger. As an example, the sensing unit 110 can determine the estimated location of the finger using TOF measurements, but the TOF measurements may be inaccurate. Accordingly, the processor 117 uses the TOF information with the phase differences to update a movement of the cursor 124. The phase difference information provides supplemental information for calculating a relative displacement, which can suppress errors in the estimated location 432. The errors are suppressed to smooth erroneous jumps or abrupt deviations in the trajectory 430. The processor 117 combines the estimated location 432 with differential information 434 for ensuring accurate tracking of the finger as well as differential information for controlling precise cursor movement.

In another aspect, the expected location 432 can be updated with the relative displacement 438 based on the estimated location 432. For example, the processor 117 can determine if the estimated location 436 is within the expected location 432 in view of the first phase difference. If so, the processor 117 can update the expected location 432 with the estimated location 432 and the relative displacement 438. If not, the processor 117 can update the estimated location 432 with the relative displacement 438 alone.

FIG. 6/7/8

Figure 6:
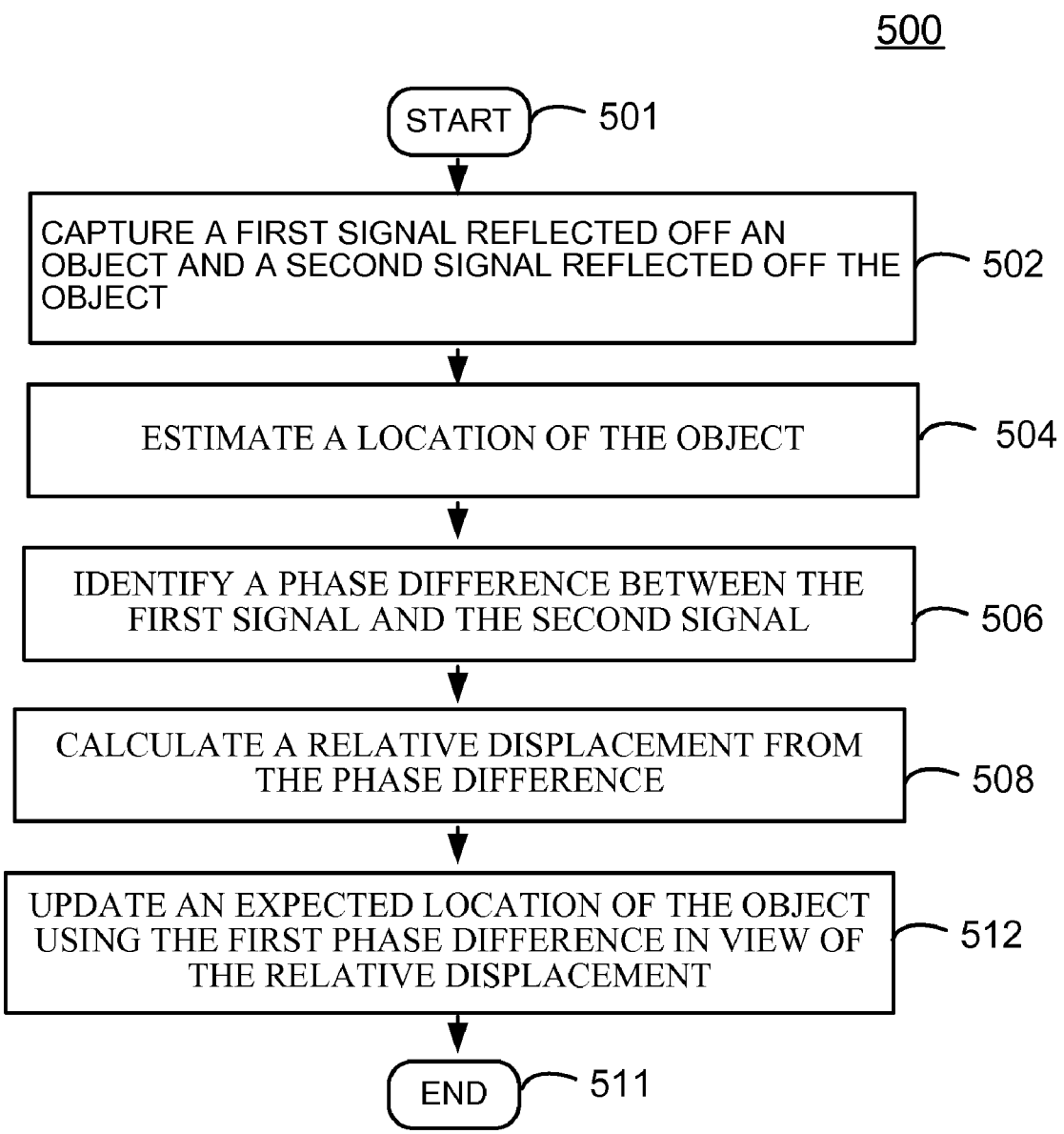
FIG. 6 is a method for updating an expected location of a controlled object in accordance with an embodiment of the inventive arrangements.

Referring to FIG. 6. a method 500 for touchless control of an object is provided. When describing the method 500, reference will be made to FIGS. 1, 3, 6-11, although the method 500 can be practiced in any other suitable system or device. Moreover, the steps of the method 500 are not limited to the particular order in which they are presented in FIG. 5. The inventive method can also have a greater number of steps or a fewer number of steps than those shown in FIG. 6. Accordingly, the invention is not limited to these particular steps.

Figure 8:
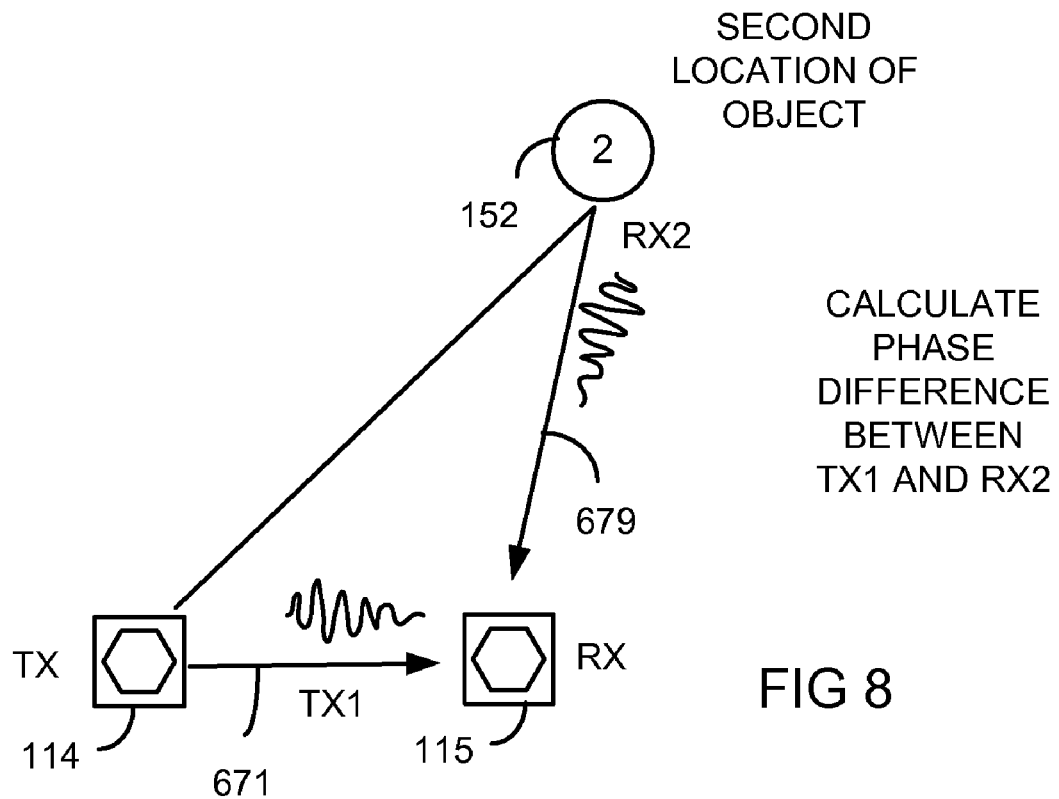
FIG. 8 is a second arrangement for calculating a phase difference in accordance with an embodiment of the inventive arrangements.

At step 501, the method can start. At step 502, a first signal reflected off a control object and a second signal reflected off the control object can be captured. For example, referring to RIG 7, a transmitter 114 of the sensing unit 110 can emit an ultrasonic signal in the direction of a finger at a first location. The receivers 113 and 115 on the sensing unit 110 can each receive a return signal for each transmitted signal reflected off the finger. Only receiver 115 is shown in FIG. 8. The receiver 115 can receive a first signal 677 at a first time corresponding to the first location 151, and a second signal 679 at a second time corresponding to the second location 152. Similarly, the receiver 113 (not shown) can also receive a pair of reflected signals. In the arrangement shown, the first signal and the second signal are both reflected off the object. In this case, the processor 117 can calculate a phase difference between first signal 677 and second signal 679.

Referring to FIG. 8, another arrangement for capturing a first and second signal is shown. In particular, the first signal 671 corresponds to a direct signal from the transmitter 114 to the receiver 115. The second signal corresponds to the signal reflected off the object 152 at the second location. In this case, the processor 117 can calculate a phase difference between first signal 671 and second signal 679, to determine a chance in position of the object. In practice, the signal 671 is relatively constant and does not deviate significantly. The signal 671 is used as a phase reference when the transmitted signals are emitted at a rate faster than the object is moving.

Returning back to FIG. 6, at step 504, a location of the finger can be estimated from the first signal and the second signal. Notably, the location of the finger may require the analysis of two sets of return signals as previously described in FIG. 7. For example, referring to FIG. 7, the processor 117 (See FIG. 1) can estimate a first time of flight (TOF) for the first signal for the receiver 115. Similarly, the processor 117 can estimate a second time of flight (TOF) for a second signal (not shown) for receiver 113 (not shown). The processor 117 can generate an elliptical loci of points for the first TOF and the second TOF and calculate an intersection of the two ellipsoids as previously discussed. The intersection identifies the location of the object. It should also be noted that the sensing unit 110 can include multiple receivers thereby increasing the number of TOFs and the resolution for location accuracy. The processor 117 can solve for the intersection of multiple ellipsoids to determine the location of the object. As an example, the processor 117 can detect a rising or falling edge of a reflected signal to determine the TOF. The processor can analyze a plurality of zero crossings within a time window to find the rising or falling edge.

FIG. 9

Figure 9:
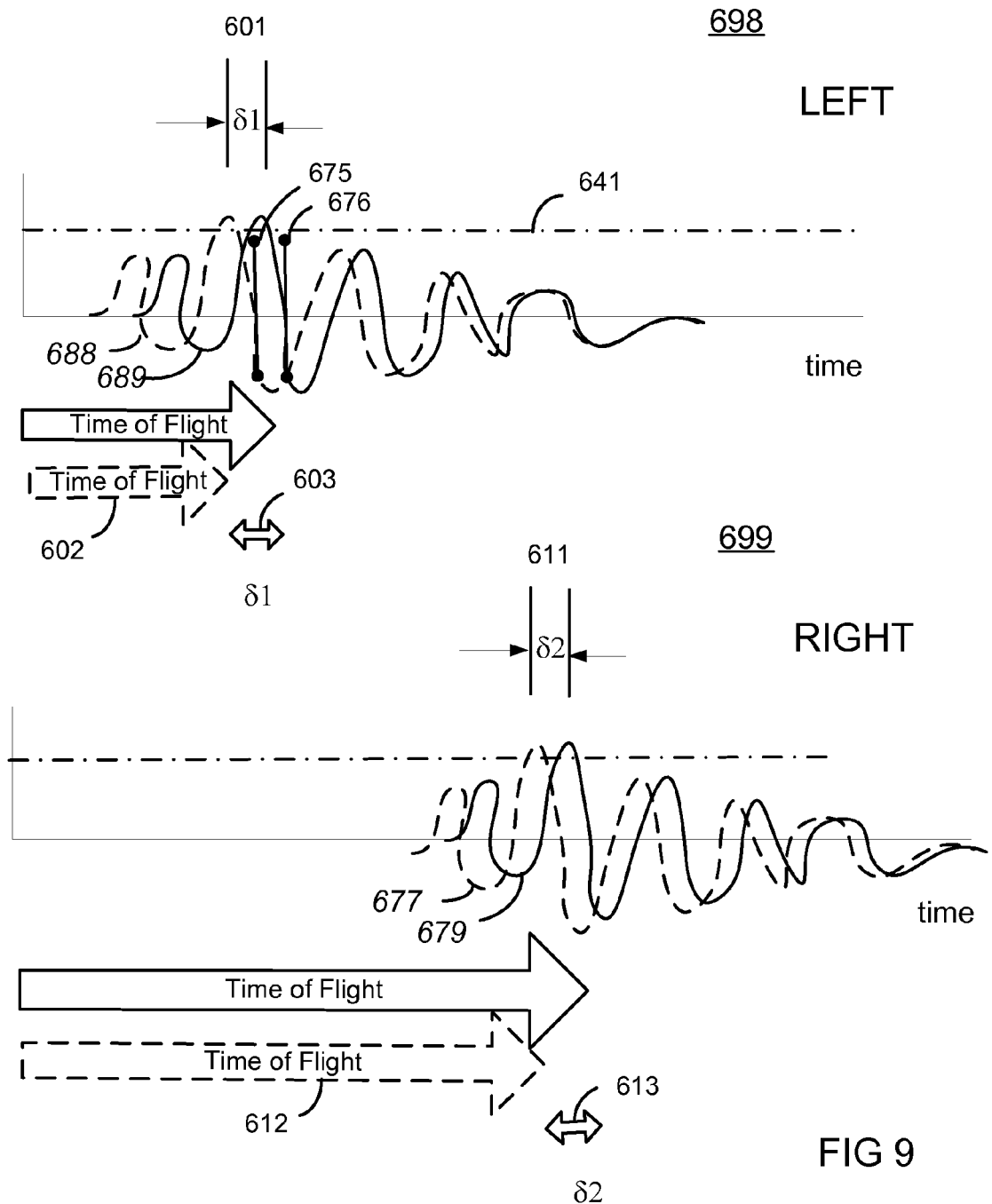
FIG. 9 is an illustration for time of flight (TOF) and differential TOF measurements in accordance with an embodiment of the inventive arrangements.

At step 506 a phase difference between the first signal and the second signal can be identified. The phase difference can be identified by measuring a differential time of flight between the first signal and the second signal. For example, referring to FIG. 7, the processor 117 can calculate the phase difference from an analysis of the zero crossings for the first signal 677 and the second signal 679. Referring to FIG. 9, two subplots are shown each representing a reflected (received) signal waveform at two time intervals. The left solid line plot 688 is a graphical representation of a signal received by the receiver 113, and the right plot 677 is a graphical representation of a signal received by the receiver 115. The left dotted line plot 689 is a graphical representation of a signal received by the receiver 113 at a later time, and the right plot 679 is a graphical representation of a signal received by the receiver 115 at the later time. In practice the signals of each subplot can lag or lead each other based on the location of the finger and the positioning of the sensors 113-115, i.e., the dotted line plot can lead or lag the solid line plot. The plots are provided for illustrating the method of differential motion for moving a cursor, e.g. phase differences. In subplot 698, a TOF can be measured for 688 and 689 by estimating the arrival time of the waveform. For example, the sensing unit 110 can include a threshold detector for determining when the signal reaches a certain threshold, marked by the dotted line 641. The point at which the signal amplitude crosses the threshold marks the time of flight. For example, the arrow 602 illustrates the TOF for 689. The sensing unit 110 can include a zero-crossing gate within the region of threshold to also estimate the TOF. FIG. 6. also illustrates the differential time of flight (dTOF) for 698 and 699 identified as $\delta 1$ (603) and $\delta 2$ respectively. The phase detector 116 calculates the dTOF from the time difference between zero-crossings within the threshold region denoted by 675 and 676.

At step 508, a relative displacement can be calculated from the phase differences. The relative displacement of the finger can be a measure of the distance the finger has moved in a coordinate system of the finger. Recall from FIG. 5, that the relative displacement can be a weighting of the phase difference by the expected location and the estimated location. For example, the relative displacement can be the phase difference when the estimated location is within the expected location. The relative phase difference can be a weighted phase difference when the estimated location is outside the expected location.

The processor 117 can store a history of relative displacements and expected locations for creating the trajectory 430 (See FIG. 5). The processor 117 stores previous dTOFs and corresponding positional information which can be referred upon over time to show a direction of the finger movement. For example, referring to FIG. 1, the phase detector 116 determines the dTOF, and the processor 117 uses the dTOF to determine the change in location of the finger in the touchless sensing space 101. The dTOF is a relative TOF, which the processor 117 converts to coordinate information in view of the estimated location and the expected location. For example, referring to FIG. 9, the signal trace 679 occurs at a later time than signal trace 678, which implies that the TOF is longer and accordingly the finger is moving away from the receiver 115. A dTOF will either have a positive or negative sign indicating which direction the change is occurring. The processor 117 determines the relative displacement and the direction from the dTOF analysis.

In one aspect, the relative displacement can be updated in view of the estimated location for moving the cursor. For example, referring to FIG. 3, the phase detector 116 calculates a relative displacement of a moving finger. The processor 117 determines a current estimate location of the finger and also accesses the expected locations identified in the trajectory 430 (See FIG. 5) from the memory 118. The processor 117 updates the expected location of the finger using the estimated location of the finger supplemented with the relative displacement information. In effect, the processor 117 calculates two estimates for the current finger position, 1) using only TOF, and 2) using expected location coupled with differential motion information (dTOF).

Returning back to FIG. 6, at step 512, an expected location of the object can be updated using the first phase difference in view of the relative displacement. Notably, the first phase difference is used to update the expected location based on the relative displacement. For example, referring back to FIG. 7, the sensing unit 110 captures the first signal 677 and the second signal 679 reflected off the moving object. The phase detector 116 identifies a first phase difference 611 between the first signal 677 and the second signal 679, and the processor 117 updates the expected location of the object using the first phase difference. Briefly referring to FIG. 5, the processor 117 determines the estimated location 436 of the object, and determines if the estimated location 436 is within a region of relative displacement error of the expected location 432 in view of the first phase difference 611. The processor 117 determines the relative displacement 438 of the object in view of the first phase difference, the estimated location 432, and the expected location 438. At step 511, the method 500 can end.

FIG. 10

Figure 10:
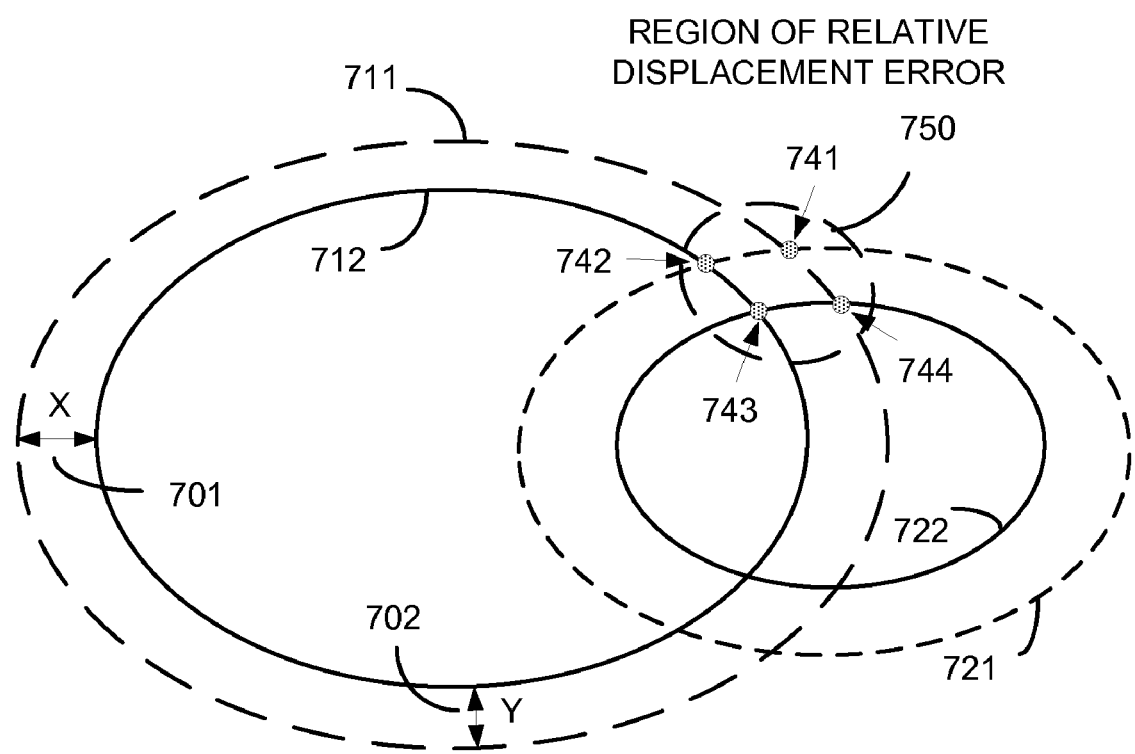
FIG. 10 is a illustration showing a region of relative displacement error in accordance with an embodiment of the inventive arrangements.

Referring to FIG. 10, a region of relative displacement error is shown. Conceptually, each ellipse represents a locus of points where a finger may be. Each receiver produces at least one ellipse based on the TOF. Two receivers produce two ellipses and the intersection of the ellipses marks the finger location. In this figure, the finger can be within the dotted circle region of 750 due to inaccuracies in estimating the TOF. For example, at time=0 the finger can be located at 743 which is the intersection of solid line ellipses 722 and 712. At time=1 the finger can be located at 741 which is the intersection of dotted line ellipses 721 and 711. The TOF identifies these precise finger locations, 741 and 743 over time. However, it is possible that the measurements of the TOF are inaccurate, possibly due to improper threshold detection, limitation of the sensing components, or to characteristics of the return signal which vary the signal amplitude. The dTOF provides a relative calculation versus an absolute calculation, and is a relative change of position over time, not a change in absolute positions. Accordingly, the dTOF supplements the positional TOF calculations, and also provides an indication of relative direction, velocity, and acceleration.

Briefly referring back to FIG. 9, the phase difference can be calculated for each single trace using a zero crossing detection at time=0 and time=1. For example, the phase detector calculates $\delta 1$ from the time difference of the received signals at the zero crossing locations 675 and 676. The phase detector calculates $\delta 2$ from the time difference of the received signals at the zero crossing locations 677 and 678. However, these are one-dimensional dTOF values specific to the return signal TOF measurements received at each receiver 113 and 115. The dTOF values alone do not convey any information as to how errors in the one-dimensional dTOF measurements affect resolution in the two-dimensional coordinate system of the finger. However, δ1 and δ2 are differentially related based on the geometric arrangement of the sensors. For example, the receivers 113 and 115 can both receive the same return signal albeit with different phase. Accordingly, a change in δ1 results in a change of δ2. The differentials δ1 and δ2 are together involved in generating the elliptical equations for calculating the intersection of the ellipses for determining the location of the finger.

The first phase difference δ1 results in a change in one dimension such as the x-dimension 701, and a second phase difference δ2 results in a change in one dimension such as the y-dimension 702. Due to the arrangement and timing configuration of the sensors, a time dependency is established between the two receivers wherein two differential time changes (δ1 and δ2) each in a one-dimensional space translate together as a single movement in two-dimensions. For example, at time=0 an ellipse 722 for the rightmost receiver 115 is shown, and an ellipse 712 is shown for the leftmost receiver 113. If at time=1 a dTOF for leftmost receiver 113 is δ$\tilde{1}$ and for the rightmost receiver 115 is δ2 then the ellipse 712 does not change. However, ellipse 722 has increased due to dTOF and expands out to ellipse 721. In this case, the finger moved to 742. The same holds if the opposite were to happen, (i.e. δ1=1 and δ2=0) In this case, ellipse 712 would change and expand to 711, and ellipse 722 would not change, and the finger moved to 744. The region of relative displacement error can be described by the enclosed area of 750. Miscalculation in the TOF and dTOF can lead to inaccuracies in calculating the finger position as well as direction, acceleration, and velocity components. Combining the absolute location with relative displacement minimizes the region of absolute location error and relative displacement error.

FIG. 11

Figure 11:
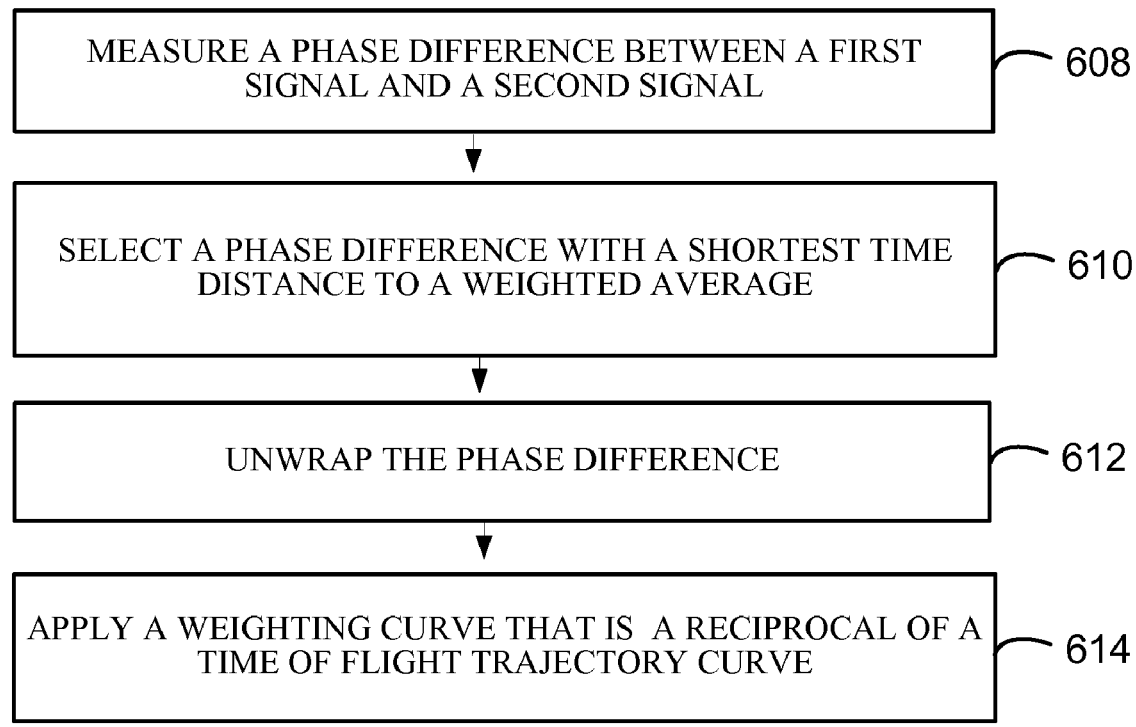
FIG. 11 is method for calculating a phase difference in accordance with an embodiment of the inventive arrangements.

Referring to FIG. 11, a method 600 for smoothing relative phase discrepancies is presented. The steps of the method 600 are not limited to the particular order in which they are presented in FIG. 11. The method 600 can also have a greater number of steps or a fewer number of steps than those shown in FIG. 11.

At step 608, at least one phase difference can be measured a first signal and a second signal. Multiple phase differences can be calculated for multiple signal. For example, referring to FIG. 9, the phase detector 116 can estimate a phase difference between a first 688 and a second 689 signal captured at the left receiver 113. The phase detector 116 identifies the zero crossings 675 and 676 and determines the sample time delay δ1. The phase detector 116 also estimates a phase difference between a first 677 and a second 679 signal captured at the right receiver 115. The phase detector 116 identifies the zero crossings and determines the sample time delay δ$\tilde{2}$ At step 610, phase discontinuities over time can be mitigated by selecting a phase difference with the shortest time distance to a time weighted average of said absolute locations saved in said history. For example, referring to FIG. 9, the processor 117 can store previous estimated locations, phase differences, and relative displacements in memory 118. The processor 117 can average the estimated locations and relative displacements for tracking finger location and movement. The processor 117 can apply a first order low pass filter $1-0.7\ z^{-1}$ for smooth the time average of the trajectory 430 (See FIG. 5). The phase detector 116 can generate more than one candidate zero crossing point to compensate for threshold detection. For example, the phase detector 116 can generate a threshold that is activated when a return signal exceeds the threshold. This can occur when the pulse sent by the transmitter 114 is reflected from the finger and returns to a receiver 113 or 115. The return signal however varies in amplitude and does not always cross the threshold at the same sample location. The phase detector 116 can set an allowable window of time after the threshold is reached for identifying zero crossing locations. The phase detector 116 references the memory 118 to determine where the last zero crossing locations of the previous return signal were located. A continuous finger movement exhibits a continuous change in the return signal. The zero crossings move together ensemble as the finger moves. For example, the zero crossing 676 has not moved far from the earlier zero crossing time 675, but the zero crossing location could be confused with one of the other zero crossings located along 689. Accordingly, a phase difference with the shortest time distance to the historic zero-crossing location is more likely to be the correct zero crossing location to reference. In another arrangement, multiple zero crossing locations are determined for tracking a sorted index of zero crossing locations.

FIG. 12

At step 610, the phase difference can be unwrapped by changing absolute jumps greater than a pre-specified threshold to a phase complement of the pre-specified threshold, wherein said pre-specified threshold is a time distance to said location reference. For example, referring to FIG. 12, a simulation illustrating the positioning of a object using time of flight measurement is shown. The plot shows the expected location for an object at twenty points along a horizontal line. For example, referring to FIG. 1, the object is swept along a horizontal line in the touchless sensing space 101, and TOF measurements are taken at each of the points. The receiver RX 113, the transmitter TX 114, and the receiver RX 115 of the sensing unit 110 are shown. The sweep number represents the locations of the finger. At each point, an ellipse specifying the locus of points where the finger can reside can be calculated from the TOFs. Only two pairs of ellipses are shown for illustration, corresponding to the first location 851 and the final twentieth location 852. The object is moved from the left at the first location 851 to the right at the second location 852 sensor for producing a TOF curve.

FIG. 13

Figure 13:
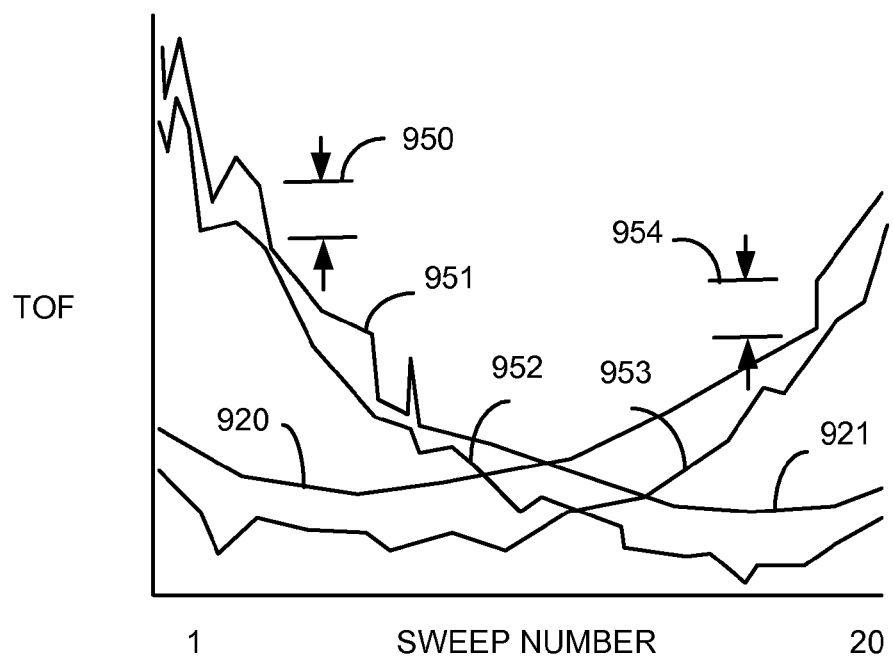
FIG. 13 is a simulation plot for TOF measurements in FIG. 12 in accordance with an embodiment of the inventive arrangements.

Referring to FIG. 13, the TOF curve 952 for RX 113 is shown, and the TOF 953 curve for RX 115 is shown. The TOF curve 952 and TOF curve 953 are not completely smooth due to inaccuracies in the TOF measurement as mentioned previously. A smoothed sweep 951 for the TOF curve 952, and a smoothed sweep 960 for the TOC curve 953 is shown. The smoothed sweeps 951 and 960 show phase jumps at locations 951 and 954. Referring back to FIG. 3, the processor 117 can unwrap the phased to mitigate the phase jumps seen at these locations.

Figure 7:
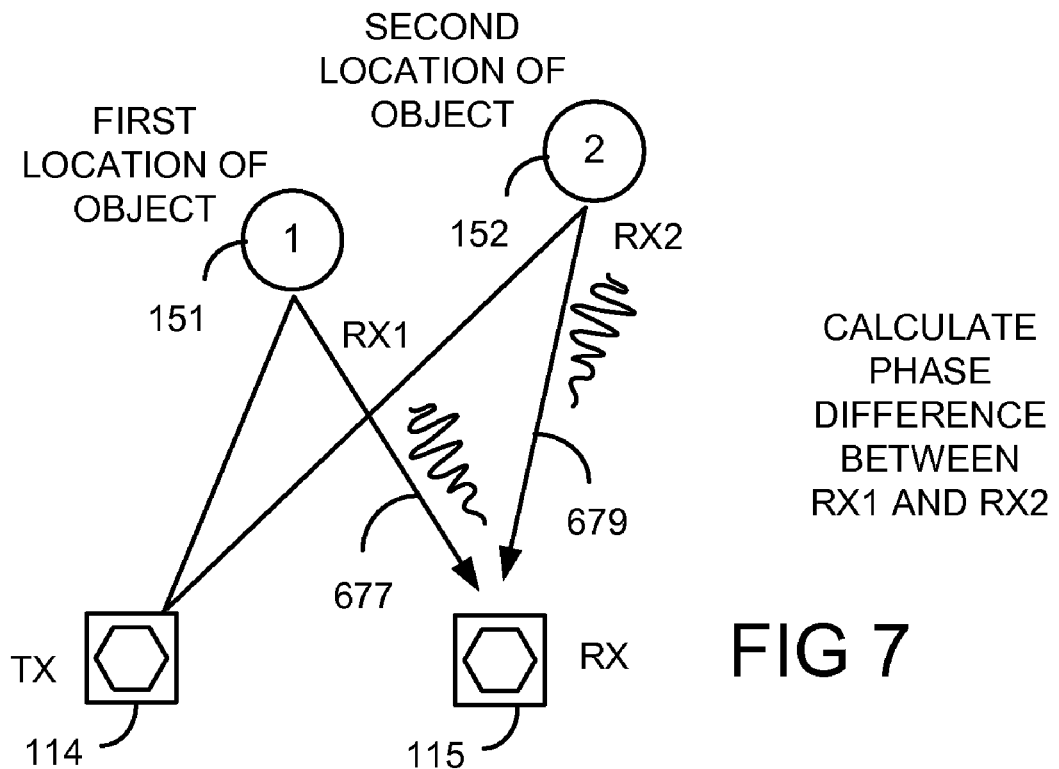
FIG. 7 is a first arrangement for calculating a phase difference in accordance with an embodiment of the inventive arrangements.

At step 610, a weighted average of the first phase difference and the second phase difference can be applied for producing a composite phase difference, where the weighting is a function of the absolute location for smoothing the relative displacement of the finger movement. Referring to FIG. 7, errors in the first phase difference δ1 and second phase difference δ2 from FIG. 9 result in a region of relative displacement error. The processor 117 apples a weighted average of the first phase difference and the second phase difference to minimize the region of error 750. The weighting can be a function of the absolute position, and the weighting applied to δ1 and δ2 varies according to the absolute location.

Figure 12:
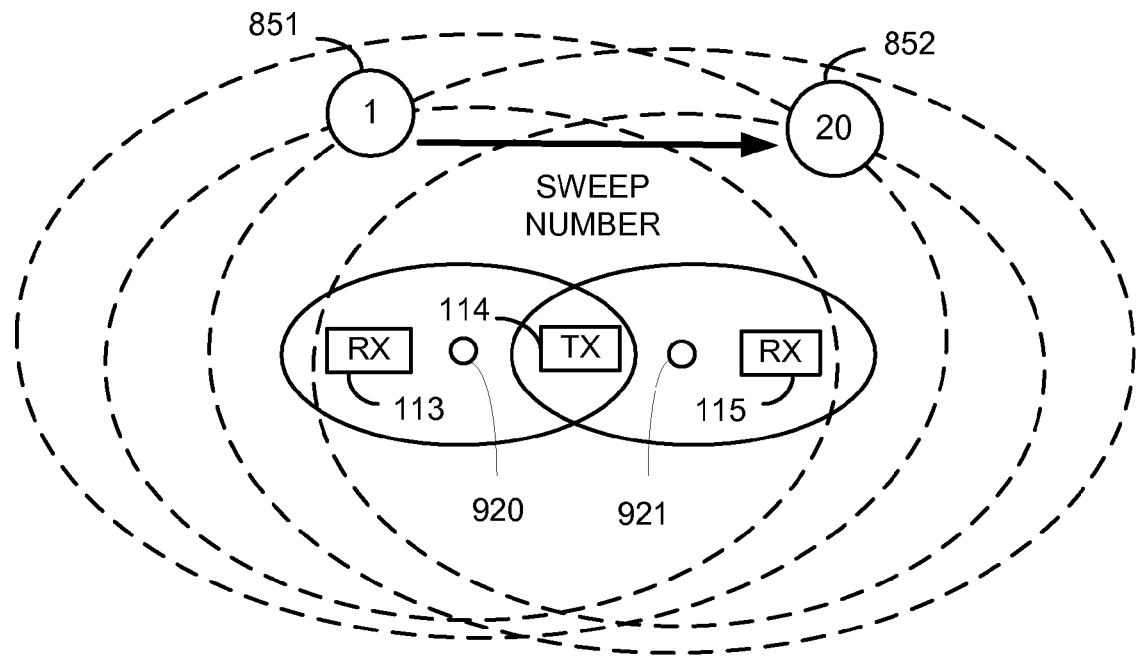
FIG. 12 is an illustration for sweeping TOF measurements in accordance with an embodiment of the inventive arrangements.

The TOF curve 951 has a minimum which corresponds to the center point 920 of FIG. 12 between TX 114 and RX 115. The TOF curve 954 also has a minimum which corresponds to the center point 921 between RX 113 and TX 114 of FIG. 12. Also, the dTOF is the derivative of the swept TOFs. Accordingly, with respect to RX 113, as the finger (FIG. 8) sweeps from left to right, the sensitivity of the dTOF decreases as a function of the slope on 951 until a minimum at the center point 920. The same result applies, with respect to RX 115, as the finger sweeps from right to left. i.e., the sensitivity of the dTOF decreases as a function of the slope on 954 until a minimum at the center point 921. Referring back to FIG. 10, the decreased sensitivity of the dTOF results in an increased region of relative displacement error 750 as the finger moves around in the touchless sensing space. Accordingly, a weighting function which is the reciprocal of the TOF sweep can be applied to normalize the relative displacement error. For example, without weighting, the region of error 750 would dilate or compress in size based on the absolute position. With the weighting the region of error 750 remains more or less the same size. Accordingly, dTOF errors are consistent with regard to finger location.

FIG. 14

The processor 117 determines the estimated location of the finger from the TOF measurements provided by the sensing unit 110. The processor 117 generates a family of weighting functions (see FIG. 13) and applies the weighting function to the first and second phase differences to creating a composite phase difference. The processor 117 converts the composite phase difference to a cursor coordinate. For example, the composite phase difference provides the finger direction and finger movement along the x-axis and y-axis which can be sent to the host device 120 for moving the cursor 124 on the host display 122.

Figure 14:
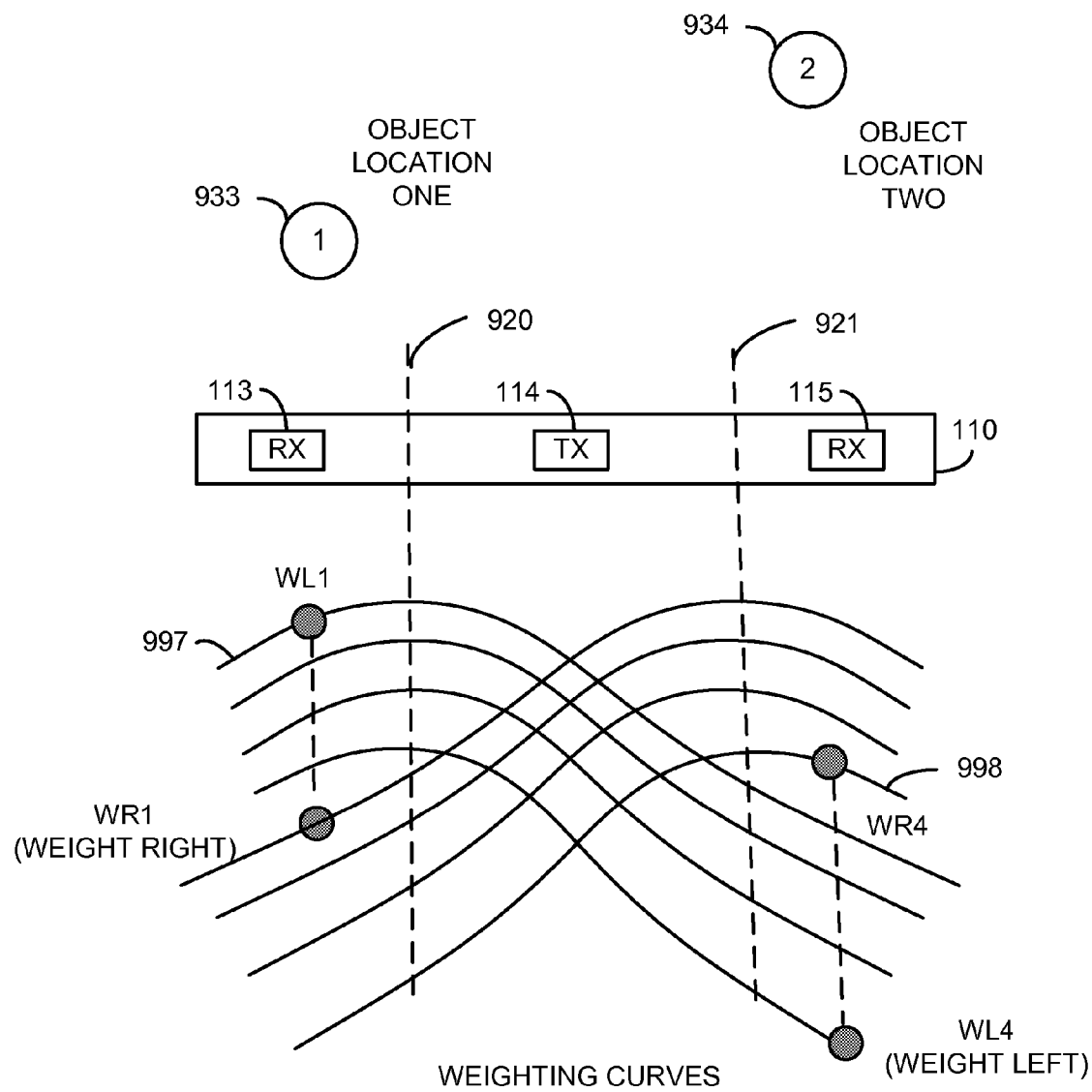
FIG. 14 is a family of weighting curves in accordance with an embodiment of the inventive arrangements.

For example, referring to FIG. 14, two points of a weighting function are applied to the first phase difference and second phase difference when the finger is in the touchless sensing space 101. A first finger position 933 and a second finger position 934 to illustrate how the weighting functions are applied. Two points of the weighting function 997 (curve 1) can be applied to the first phase difference and second phase difference when the finger is just above the receiver 113. The weighting functions are symmetric due to the geometry of the receivers on the sensing unit 110. The weighting functions are different for different sensing configurations. For example, the processor 117 uses curve 991 when the finger is close to the sensing unit, i.e., finger position one 933 hovering above the sensing unit 110. Alternatively, the processor 117 uses curve 998 when the finger is high above the sensing unit i.e., finger position two 934. A visual comparison reveals that the weighting function of FIG. 10 are reciprocally related to the TOF sweeps of FIG. 9. As the finger moves closer to the sensing unit 110, the dTOF becomes more sensitive across the sweep and reaches a minimum at the center point locations 920 and 921 as previously mentioned. As the finger moves farther away from the sensing unit, the dTOF is not as sensitive though it also reaches a minimum at the center point locations 920 and 921. Accordingly, with the finger in position one (933) the processor 117 applies a weight value WL1 to the first phase difference and a weight value WR1 to the second phase difference. With the finger in position two (934) the processor 117 applies a weight value WR4 to the first phase difference and a weight value WL4 to the second phase difference. The processor 117 produces a composite phase difference as the weighted sum of the first and second phase difference. The composite phase difference provides the relative displacement which the position input device 111 uses for precisely controlling the cursor 124.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An input device for touchless object control, comprising:
   a sensing unit comprising:
      a transmitter for transmitting an ultrasonic signal; and
      a receiver for capturing a first reflected signal off an first object at a first location and a second reflected signal off the object during movement to a second location;
   a phase detector operatively coupled to the receiver for identifying a phase difference between the first reflected signal and the second reflected signal; and
   a processor operatively coupled to the phase detector and the sensing unit for updating an expected location of the object using the phase difference, and controlling a user interface component in view of the expected location, wherein the processor
   measures a first Time of Flight (TOF) between the transmitting of the ultrasonic signal and the capturing of the first reflected signal, and producing therefrom the expected location of the object at the first location,
   measures a second Time of Flight (TOF) between the transmitting of the ultrasonic signal and the capturing of the second reflected signal, and producing therefrom an estimated location of the object at the second location, and
   determines a relative displacement of the object by weighting a difference of the expected location and estimated location with the phase difference.

2. The input device of claim 1, wherein the estimated location is determined from the second time of flight measurement (TOF), and the relative displacement is evaluated within an error region determined from a differential time of flight measurement (dTOF).

3. The input device of claim 1, wherein the processor determines the relative displacement of the object by multiplying the phase difference with a subtraction of the estimated location and the expected location.

4. The input device of claim 1, wherein the input device is an ultrasonic sensor, an optical sensor, an imaging element, a camera element, or a laser element.

5. An input device for touch less object control, comprising:
   a sensing unit comprising:
       a transmitter for transmitting a signal; and
       a receiver for receiving a first received signal reflected off an object and thereafter receiving a second received signal reflected off the object;
   a phase detector operatively coupled to the receiver for identifying a phase difference between the second received signal and the first received signal; and
   a processor operatively coupled to the phase detector and the sensing unit for
   measuring a first Time of Flight (TOF) for the first received signal to produce an expected location of the object at a first location,
   measuring a second Time of Flight (TOF) for the second signal to produce an estimated location of the object at a second location,
   applying a weighted difference of the expected location and the estimated location to the phase difference to produce a relative displacement; and
   updating the expected location of the object with the relative displacement in view of the expected location.

6. The input device of claim 5, wherein the processor identifies the estimated location of the object, and determines if the estimated location is within a region of relative displacement error of the expected location determined from differential time of flight (dTOF) measurements in view of the phase difference.

7. The input device of claim 5, wherein the processor determines the relative displacement of the object in view of the phase difference, the estimated location, and the expected location.

8. The input device of claim 5, wherein the input device tracks a touchless finger movement and controls an object in accordance with the finger movement.

9. The input device of claim 5, wherein the sensing unit includes a transmitter that generates a radiation pattern which is maximally wide in a generally vertical plane.

10. A method for touch less object control, the method comprising the steps of:
   monitoring a movement of an object by measuring, with a processor, a first Time of Flight (TOF) to the object from a first reflected signal to produce an expected location of the object;
   estimating, with said processor, a location of the object to produce an estimated location by measuring a second Time of Flight (TOF) to the object from a second reflected signal;
   calculating, with a phase detector, a phase difference between the first reflected signal and the second reflected signal;
   weighting, with said processor, a difference of the expected location and estimated location with the phase difference to produce a relative displacement of the object; and
   updating, with said processor, the expected location of the object in view of the estimated location with the relative displacement.

11. The method of claim 10, further comprising:
    controlling a second object in accordance with the relative displacement.

12. The method of claim 10, further comprising:
    determining if the estimated location is within a region of the relative displacement of the expected location in view of the phase difference; and,
    if so, updating the expected location with a weighted difference of the estimated location and the relative displacement;
    if not, updating the expected location with the relative displacement.

13. The method of claim 10, wherein calculating the relative displacement comprises:
    capturing a first signal reflected off the object and a second signal reflected off the object; and
    identifying the phase difference between the first signal and the second signal.

14. The method of claim 10, wherein calculating a relative displacement comprises:
    capturing a first transmitted signal and a first received signal reflected off the object; and
    identifying a first phase difference between the first transmitted signal and the first received signal.

15. The method of claim 10, further comprising:
    updating the relative displacement in view of the expected location and the estimated location.

16. The method of claim 10, further comprising weighting a phase difference of the relative displacement with a reciprocal of a Time of Flight (TOF) curve.

17. The method of claim 16, further comprising performing a time weighted average of expected locations for updating the relative displacement.

18. The method of claim 16, further including mitigating phase discontinuities over time by selecting a phase difference with the shortest time distance to a time weighted average of the estimated locations.

* * * * *